(12) United States Patent
Li Wu

(10) Patent No.: US 12,713,506 B1
(45) Date of Patent: Aug. 18, 2026

(54) SINGLE DRIVER CIRCUIT FOR DRIVING A VISIBLE LIGHT SOURCE AND AN INFRARED LIGHT SOURCE

(71) Applicant: Amazon Technologies, Inc., Seattle, WA (US)

(72) Inventor: Aloun Richard Li Wu, Malden, MA (US)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 18/605,480

(22) Filed: Mar. 14, 2024

(51) Int. Cl.
*H05B 45/375* (2020.01)
*G03B 15/03* (2021.01)
*H05B 45/39* (2020.01)
*H05B 47/14* (2020.01)

(52) U.S. Cl.
CPC .......... *H05B 45/375* (2020.01); *G03B 15/03* (2013.01); *H05B 45/39* (2020.01); *H05B 47/14* (2020.01)

(58) Field of Classification Search
CPC ...... H05B 45/375; H05B 45/39; H05B 47/14; G03B 15/03
See application file for complete search history.

(56) References Cited

U.S. PATENT DOCUMENTS

| | | | | |
|---|---|---|---|---|
| 10,930,126 | B1 * | 2/2021 | Jeong | H04N 23/611 |
| 2009/0189548 | A1 * | 7/2009 | Hoffman | F21L 4/04 315/307 |
| 2015/0061544 | A1 * | 3/2015 | Hamanaka | H05B 45/3725 315/307 |
| 2018/0041681 | A1 * | 2/2018 | Pope | F21V 23/0464 |

OTHER PUBLICATIONS

Heisener.com, "Texas Instruments LM25116 Wide-Range Synchronous Buck Controller", 4 pages, Dec. 21, 2022 (Year: 2022).*

* cited by examiner

*Primary Examiner* — Daniel D Chang
(74) *Attorney, Agent, or Firm* — K&L Gates LLP

(57) ABSTRACT

Systems, apparatuses, and techniques are described for driving a plurality of light sources, such as a combination of infrared and visible light sources for a camera. Example systems and apparatuses are described which may comprise a control circuit including a buck driver for providing various currents to a bridge circuit. Each branch of the bridge circuit may include a respective light source which may require a respective current to operate safely and effectively. The bridge circuit may further include a voltage divider which may couple the different branches of the bridge circuit to a feedback pin of the buck driver. Each light source may be driven by the control circuit utilizing a common buck driver. The control circuit may activate or turn on any of the light sources and/or the control circuit may deactivate or turn off all of the light sources.

20 Claims, 5 Drawing Sheets

SINGLE DRIVER CIRCUIT FOR DRIVING A VISIBLE LIGHT SOURCE AND AN INFRARED LIGHT SOURCE

BACKGROUND

Light Emitting Diodes (LED) provide digital cameras with a light source for illuminating an environment in order to better capture video. LEDs may emit visible or infrared light. An LED that emits light that appears white is commonly called a white LED, or wLED. Infrared (IR) Light Emitting Diodes (IRLED) allow digital cameras to capture video in low light or no light environments. Some camera systems, such as security systems, utilize digital cameras with wLEDs or IRLEDs in order to monitor an environment during the day or night.

DETAILED DESCRIPTION

Figure 1A:
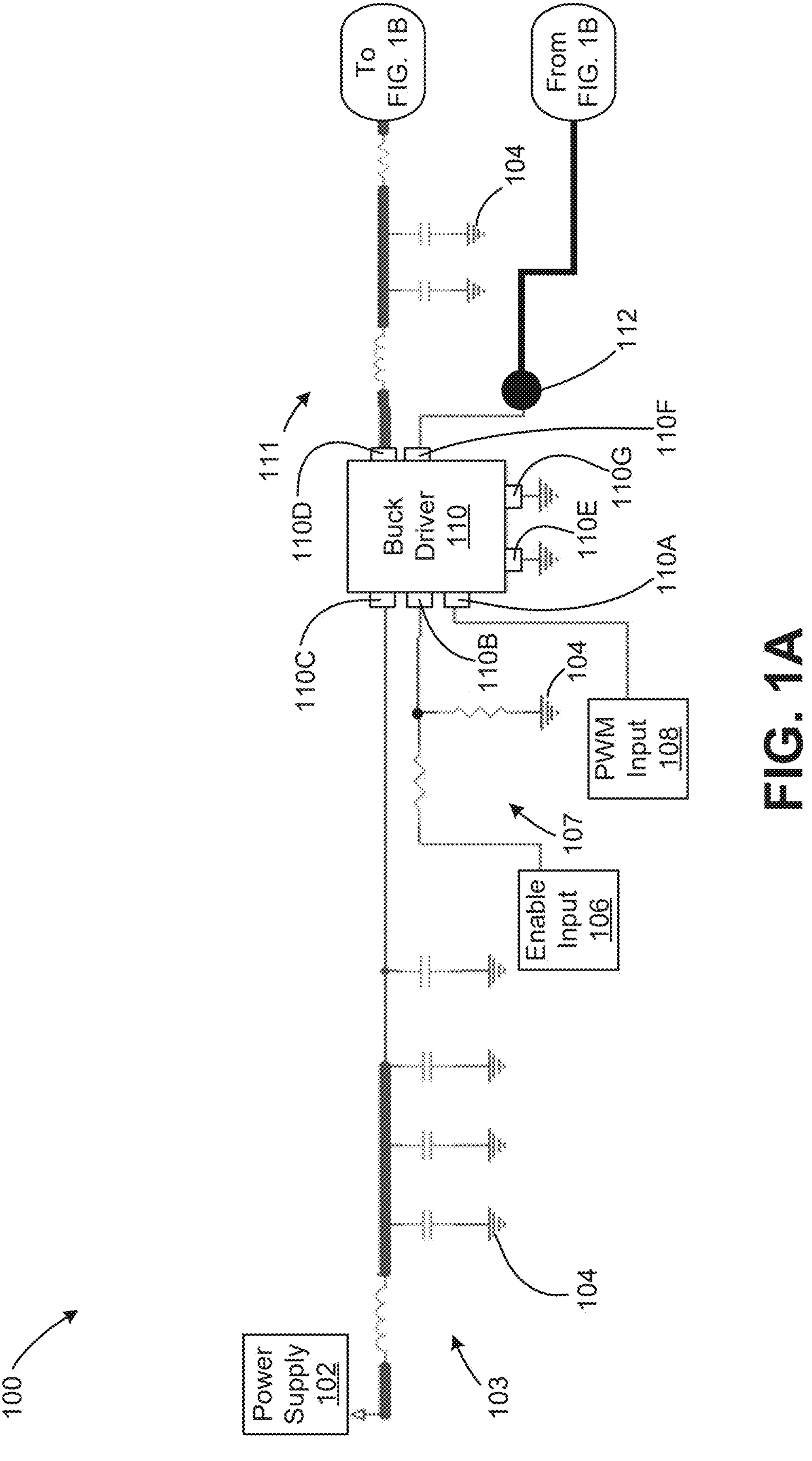
FIG. 1A illustrates an example control circuit for driving various light sources of an example electronic device, in accordance with various aspects of the present disclosure.

In the following description, reference is made to the accompanying drawings which illustrate several examples for the present disclosure. It is understood that other embodiments may be utilized and that mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

As smaller electronic cameras and better resolution lenses become more cost effective to produce, these cameras and lenses have been widely integrated into many technologies, such as computer vision technologies (e.g., robotics, videogames, augmented reality, autonomous vehicle navigation, smart projectors, object recognition, etc.) and physical security technologies (e.g., security systems, doorbell cameras, smartphones, etc.) leading to many benefits for consumers. Individuals (e.g., homeowners, small business owners, etc.) and large entities (e.g., national and international corporations, governments, etc.), for example, rely more heavily on electronic cameras to protect individuals (e.g., family members, employees, etc.) and secure their property (e.g., homes, warehouses, factories, airports, etc.) against damage and theft. For example, homeowners may monitor their homes constantly (e.g., 24 hours a day, etc.) with a combination of security cameras and doorbell cameras which may record continuously or capture activity in response to a trigger (e.g., motion detection, a user input from the homeowner via a companion application, and/or the like). In addition, police may utilize security cameras to remotely monitor public spaces (e.g., public parks, government buildings, etc.) in order to capture evidence when a crime is committed and/or to deter criminal activity before it starts. Moreover, as autonomous vehicle navigation systems become more prevalent vehicle cameras (e.g., forward cameras, side cameras, backup cameras, driver monitoring cameras, etc.) can assist drivers with navigating the roadway (e.g., autopilot, lane assist, following assist, parking, etc.). Electronic cameras can also be used for entertainment, such as taking pictures with friends and family, producing online video content, and playing augmented reality video games.

As described herein, example embodiments may utilize a streamlined control circuit design to drive a plurality of light sources, such as a combination of infrared and visible light sources. In some such examples, each light source may be driven by the same control circuit and, thus, each light source does not require its own dedicated (or individual) control circuit. In some examples, any of the light sources may be active and/or all of the light sources may be deactivated (or turned off). In some examples, a single buck LED driver (e.g., a 1.5-A high efficiency synchronous buck LED driver or the like) may drive a wLED at a first current limit (e.g., a first maximum current value for which the wLED is rated) and an IRLED at a second current limit (e.g., a second maximum current value for which the IRLED is rated). It should be appreciated that a wLED and an IRLED may each have distinct (or different) forward voltages and, to maintain safe operating temperatures, each LED may not be driven above an upper power limit (e.g., 1.1 W or another limit). In addition, the wLED and the IRLED may have distinct (or different) current limits that must be maintained (e.g., at least in part by the single buck LED driver) for each LED (e.g., to prevent damage to the LEDs and/or other camera components).

In some examples, the Pulse-Width Modulation (PWM) may set the internal Feedback (FB) Voltage ($V_{FB}$) for the buck LED driver (e.g., to drive a particular current for the wLED and the IRLED respectively). For instance, a PWM of 0% to 100% may translate (or correspond) to a $V_{FB}$ of 0 mV to 100 mV. For example, a PWM of 100% may translate (or correspond) to a $V_{FB}$ of 100 mV.

Figure 4:
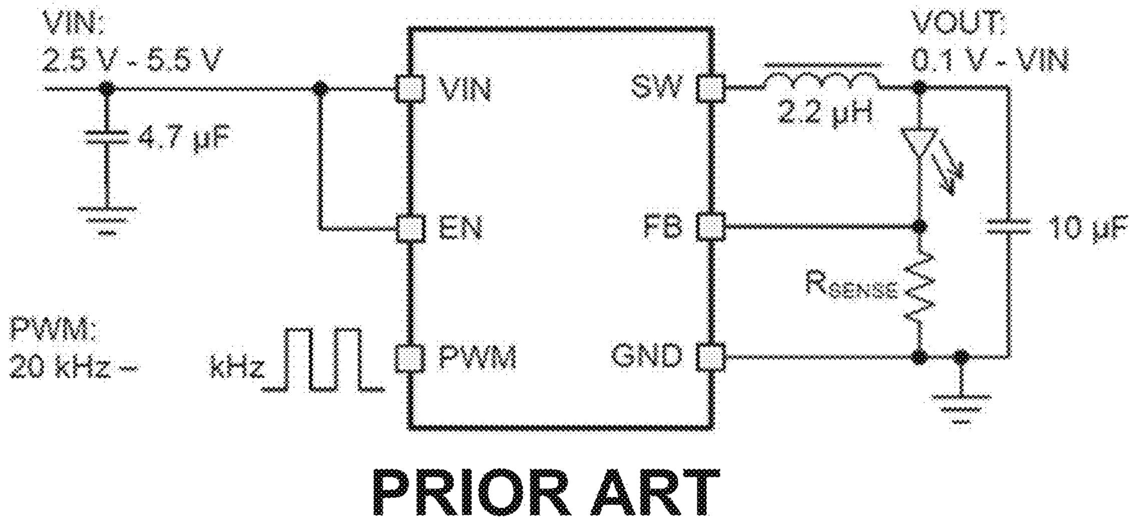
FIG. 4 illustrates a traditional buck LED driver circuit diagram.

Traditional control circuit designs (as shown in FIG. 4) use a separate buck LED driver and feedback resistor, for each LED, to set the distinct current through each LED. For instance, if a particular LED requires 1 A of current then a separate control circuit comprising a buck LED driver at 100% PWM and a feedback resistor of 0.10Ω will need to drive 1 A of current through that particular LED to achieve a $V_{FB}$ of 100 mV. Further, each additional LED will require its own separate control circuit with an additional buck LED driver and a different feedback resistor to drive a specific current through each respective LED in order to achieve a $V_{FB}$ of 100 mV. In contrast to traditional control circuit designs, example embodiments described herein use an improved single buck LED driver design which leverages a bridge circuit and/or voltage divider to create (or provide) distinct (or different) current limits for each LED (or other light sources) and, thus, reduces costs, resources, and/or form factor for each camera by removing redundant circuitry and/or electronic components that were previously required in traditional control circuits.

Accordingly, example embodiments as described herein provide improved image and/or video capture across high-light, low-light, and/or no-light lighting conditions in conjunction with other advantages, such as a smaller and more streamlined camera (e.g., requiring a smaller installation footprint) and/or less cost and/or resources to power and/or produce (e.g., due to streamlined circuitry and/or the removal of redundant electronic components). Accordingly, the present disclosure sets forth systems, methods, and apparatuses that provide improved cameras and/or systems for image and/or video capture in high-light, low-light, and/or no-light lighting conditions which provide more flexibility at a lower cost to manufacturers and/or end users (e.g., individuals, corporations, governments, etc.).

Moreover, it should be appreciated that such example embodiments as set forth herein solve particular technical problems, such as those identified and described above for traditional cameras and/or systems. For instance, because example embodiments as set forth herein can transition between high-light, low-light, and/or no-light lighting conditions, such example embodiments may not be blinded by excessive light (e.g., from a criminal's flashlight, etc.), shade or shadowing (e.g., in unlit areas, etc.), and/or pitch-black conditions (e.g., in a storage room or warehouse without windows). It will be appreciated that the scope of the present disclosure encompasses many potential example embodiments in addition to those described above, some of which will be described in further detail below.

Now that some advantages associated with example implementations described herein have been described above in contrast with traditional systems, examples of the architecture and componentry for example control circuits will now be described below with reference to FIGS. 1A-1B.

Figure 1B:
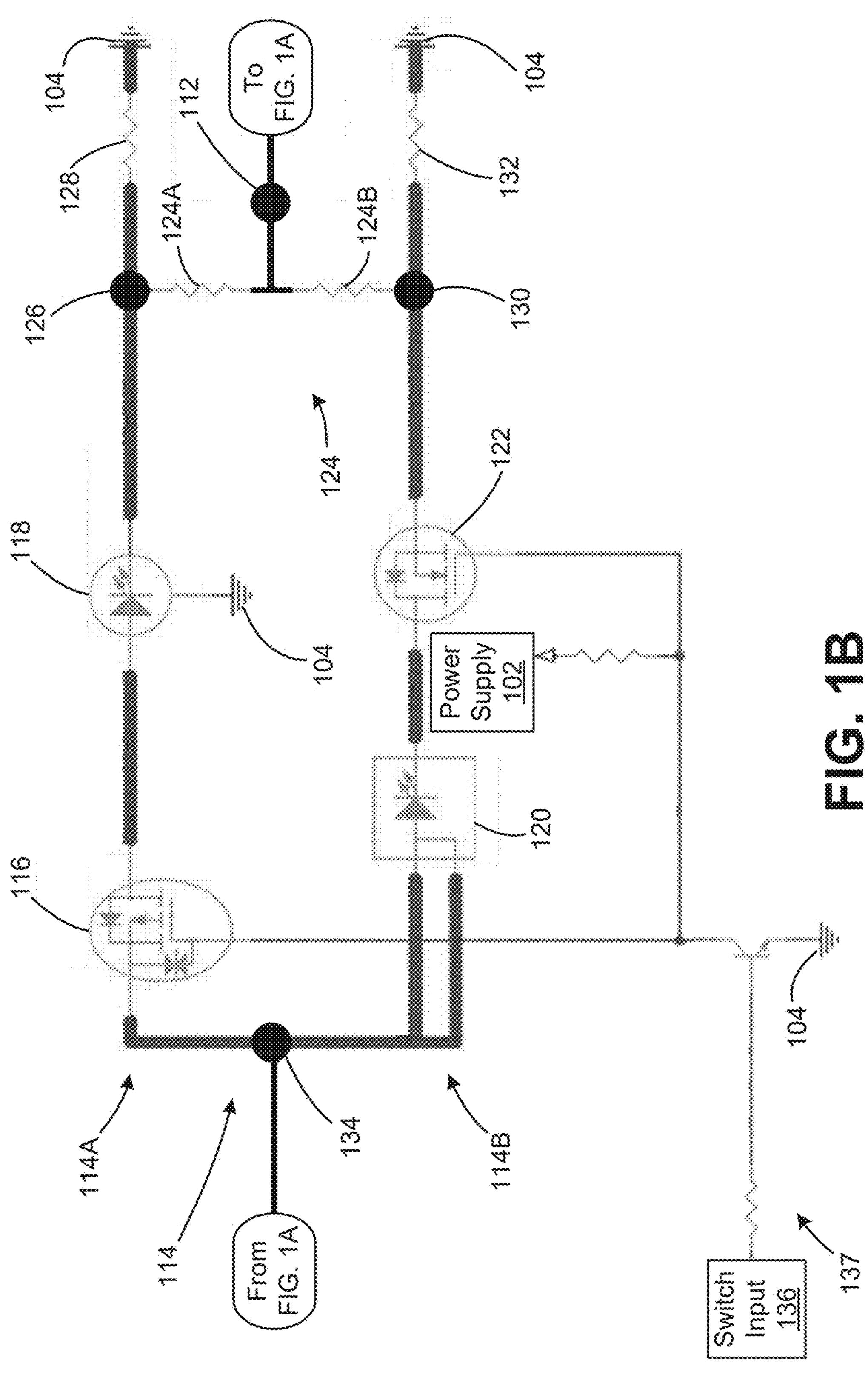
FIG. 1B illustrates an example control circuit for driving various light sources of an example electronic device, in accordance with various aspects of the present disclosure.

FIGS. 1A-1B illustrate at least an example control circuit for driving various light sources of an example electronic device (e.g., electronic device 200), in accordance with various aspects of the present disclosure. As shown in FIG. 1A, the control circuit 100 may include a power supply 102, a power supply subcircuit 103, a grounding component 104, an enable input 106, an enable input subcircuit 107, a Pulse-Width Modulation (PWM) input 108, a buck driver 110, a current output subcircuit 111, and a feedback node 112. As shown in FIG. 1B, the control circuit 100 may further include a bridge circuit 114, a switch input 136, and a switch input subcircuit 137. It should be noted that while the example control circuit illustrated in FIGS. 1A-1B includes various connections to ground component 104, in some implementations such connections may instead be made to lower potential nodes (such as nodes having lower voltages and/or negative voltages), in accordance with the desired implementation.

Turning to FIG. 1A, the power supply 102 may include one or more of a battery (e.g., single use or rechargeable), a power grid (e.g., electrical socket, public grid, microgrid, etc.), a solar panel, a transformer, and/or any other electrical power source configured to power an electronic device (e.g., electronic device 200). For example, a security camera comprising the control circuit 100 may utilize power provided to a home (or other property type, such as commercial or public property) from an electrical grid. In other examples, a security camera (or mobile device camera) comprising the control circuit 100 may utilize power provided from one or more batteries. The power supply subcircuit 103 may comprise one or more of an inductor, a capacitor, a ground connection (e.g., to the grounding component 104), and/or any other electrical components to regulate the power input to, and/or protect (e.g., from power surges, the buck driver 110. Further, as shown, the power supply subcircuit 103 may couple the power supply 102 to a power supply pin 110C of the buck driver 110.

The ground component 104 may include one or more of a negative terminal of a battery, a frame of an electronic device (e.g., mounted to a grounded structure, such as a tower or wall), an electrical socket grounding wire, an earthing electrode, the Earth, and/or any other electrical grounding used for electrical potential reference and/or for electrical shock mitigation. For example, a mobile device camera may use the negative terminal of an internal rechargeable battery as the ground component 104. In some examples, a security camera mounted inside, or to the outside of, a building (e.g., home, warehouse, retail store, etc.) may use an electrical socket grounding wire provided by the power supply 102 (e.g., a wall socket, etc.).

The enable input 106 may include one or more logical subcircuits to enable or disable the buck driver 110. In some examples, the enable input 106 may comprise and/or be coupled to a power button or switch for turning on or off an electronic device (e.g., electronic device 200). In some examples, the enable input 106 may comprise hardware (e.g., field-programmable gate arrays (FPGAs), application-specific integrated circuits (ASICs), and/or the like as described herein), software (e.g., operating systems, program code, and/or the like as described herein), and/or firmware (e.g., Basic Input/Output System (BIOS), and/or the like as described herein) for enabling the buck driver 110 (and/or any other component(s) of the control circuit 100) upon startup operations and/or for disabling the buck driver 110 (and/or any other component(s) of the control circuit 100) during shutdown operations. For example, a light source of a mobile device camera may be disabled or deactivated, at least in part, by an operating system (e.g., via the enable input 106) of an electronic device (e.g., electronic device 200) when the electronic device (e.g., a mobile device, laptop, etc.) is powered down and/or when the light source is no longer necessary. The enable input subcircuit 107 may comprise one or more of a resistor and/or a ground connection (e.g., to the grounding component 104), and/or any other electrical components to provide or regulate a device enable input signal to the buck driver 110. Further, as shown, the enable input subcircuit 107 may couple the enable input 106 to a device enable input pin 110B of the buck driver 110. In some examples, the enable input 106 may generate one or more logic high signals to enable the buck driver 110 (and/or any other component(s) of the control circuit 100). In some examples, the enable input 106 may generate one or more logic low signals to disable the buck driver 110 (and/or any other component(s) of the control circuit 100). In some examples, the enable input 106 may enable (or activate) and/or disable (or deactivate) the buck driver 110 (and/or any other component(s) of the control circuit 100) independently of other components of the control circuit 100 and/or the electronic device (e.g., electronic device 200).

The PWM input 108 may include one or more logical subcircuits to increase or decrease the power supplied via the buck driver 110 (e.g., from the power supply 102) to one or more other component(s) of the control circuit 100 (e.g., visible light source 118, infrared light source 120, etc.). In some examples, the PWM input 108 may comprise a comparator for comparing two or more voltages and/or currents of an electronic device (e.g., electronic device 200). In some examples, the PWM input 108 may comprise hardware (e.g., field-programmable gate arrays (FPGAs), application-specific integrated circuits (ASICs), and/or the like as described herein), software (e.g., operating systems, program code, and/or the like as described herein), and/or firmware (e.g., Basic Input/Output System (BIOS), and/or the like as described herein) for comparing two or more voltages and/or currents and/or for adjusting a PWM input signal. In some examples, the PWM input 108 may generate a PWM input signal to set the internal Feedback (FB) Voltage ($V_{FB}$) for the buck driver 110 (e.g., to drive a particular current for the visible light source 118 or the infrared light source 120 respectively). For instance, a PWM input signal of 0% to 100% may translate (or correspond) to a $V_{FB}$ of 0 mV to 100 mV. For example, a PWM input signal of 100% may translate (or correspond) to a $V_{FB}$ of 100 mV. In some examples, the PWM input 108 may generate and maintain a PWM input signal of 100% to set an internal $V_{FB}$ of 100 mV when the buck driver is driving either the visible light source 118 or the infrared light source 120. It will be understood that the output of the visible light source 118 and/or the infrared light source 120 may be adjusted according to (or may result from) the PWM input duty cycle. As shown, an electrical connection (e.g., a wire, strip of electrically conductive material, and/or the like as described herein) may couple the PWM input 108 to a PWM input pin 110A of the buck driver 110.

The buck driver 110 may comprise a buck LED driver (e.g., TPS92201 and/or TPS92201A made by Texas Instruments Incorporated and/or similar buck LED drivers) for regulating power, current, and/or voltage to one or more of the visible light source 118, the infrared light source 120, and/or any other electrical components of the control circuit 100. In some examples, the buck driver 110 may include a step-down converter for reducing power, voltage, and/or current to a load (e.g., visible light source 118, the infrared light source 120, and/or the like). For example, the buck driver 110 may receive a first power, voltage, and/or current from the power supply 102 at the power supply pin 110C and the buck driver 110 may produce a second lower power, voltage, and/or current at an output pin 110D.

As illustrated, the buck driver 110 may comprise a PWM input pin 110A, a device enable input pin 110B, a power supply pin 110C, an output pin 110D, a power ground pin 110E, a feedback pin 110F, an EPAD pin 110G. In some examples, the PWM input pin 110A may comprise a PWM pin of a buck LED driver (e.g., TPS92201 and/or TPS92201A made by Texas Instruments Incorporated and/or similar buck LED drivers). In some examples, the device enable input pin 110B may comprise a EN pin of a buck LED driver. In some examples, the power supply pin 110C may comprise a VIN pin of a buck LED driver. In some examples, the output pin 110D may comprise a switch pin (or SW pin) of a buck LED driver. In some examples, the power ground pin 110E may comprise a GND pin of a buck LED driver. In some examples, the feedback pin 110F may comprise an FB pin of a buck LED driver. In some examples, the EPAD pin 110G may comprise a GND pin of a buck LED driver.

The current output subcircuit 111 may comprise one or more of an inductor, a capacitor, a ground connection (e.g., to the grounding component 104), a resistor, and/or any other electrical components for regulating power, current, and/or voltage to the bridge circuit 114 (as illustrated in FIG. 1B and described in further detail below). Further, as shown, the current output subcircuit 111 may couple the output pin 110D of the buck driver 110 to a bridge circuit input node 134 (as illustrated in FIG. 1B and described in further detail below) of the bridge circuit 114.

As illustrated in FIGS. 1A-1B, some electrical circuit nodes (as described herein) (e.g., the bridge circuit input node 134, the first branch node 126, the second branch node 130, the feedback node 112, and/or any other circuit nodes described herein) are illustrated as circular round nodes, this is done for illustrative purposes and to facilitate clearer description of the example embodiments described herein. It will be understood that a "node" or "electrical node" includes any or all regions on a circuit directly between two or more circuit components (e.g., a portion of the circuit having the same potential). For example, the first branch node 126 (illustrated in FIG. 1B) may include any or all regions on the control circuit 100 coupling the visible light source 118, the first branch resistor 128, and the first voltage divider resistor 124A.

The feedback node 112, as shown in FIGS. 1A-1B, may include any or all regions on the control circuit 100 coupling the feedback pin 110F of the buck driver 110, the first voltage divider resistor 124A, and the second voltage divider resistor 124B. In some examples, the feedback node 112 may comprise a point (or location) in the control circuit 100 from which a feedback voltage ($V_{FB}$) may be determined (e.g., measured with a voltage meter or similar electrical instrumentation). It will be understood that the output voltage ($V_{out}$) of the voltage divider 124 (illustrated in FIG. 1B) may be the same or similar to the feedback voltage ($V_{FB}$) of the feedback pin 110F of the buck driver 110 (illustrated in FIG. 1A).

As described above and illustrated in FIGS. 1A-1B, the current output subcircuit 111 may couple the output pin 110D of the buck driver 110 to the bridge circuit input node 134 of the bridge circuit 114. Turning to FIG. 1B, as illustrated, the bridge circuit 114 may split (or divide) at the bridge circuit input node 134 into two branches (e.g., a first branch 114A and a second branch 114B). As shown, the bridge circuit 114 comprises a first branch 114A, a second branch 114B, and the voltage divider 124. The first branch 114A, as shown, comprises a first branch transistor 116, the visible light source 118, the first branch node 126, the first branch resistor 128, and one or more ground connections (e.g., to the grounding component 104). In some examples, the visible light source 118 may comprise one or more white or neutral light LEDs (e.g., wLEDs), such as an L1HX-50802D0000000 by Lumileds, and/or the like. In some examples, the first branch transistor 116 may comprise one or more transistors, such as bipolar junction transistors (BJTs), metal oxide semiconductor field effect transistors (MOSFETs), P-channel transistors, N-channel transistors, an SSM3J328R by Toshiba, and/or the like.

The second branch 114B, as shown, comprises a second branch transistor 122, the infrared light source 120, the second branch node 130, the second branch resistor 132, and one or more ground connections (e.g., to the grounding component 104). In some examples, infrared light source 120 may comprise one or more infrared emitters, such as an LTE-R38386C-YQ8-BK by Lite-On Inc., and/or the like. In some examples, the second branch transistor 122 may comprise one or more transistors, such as one or more MOSFETs, BJTs, P-channel transistors, N-channel transistors, an NXV55UN by Nexperia, and/or the like. The voltage divider 124, as shown, comprises the first voltage divider resistor 124A and the second voltage divider resistor 124B. In some examples, a resistor (e.g., the first branch resistor 128, the second branch resistor 132, the first voltage divider resistor 124A, the second voltage divider resistor 124B, and/or any other resistor described herein) may include one or more of a fixed resistor (e.g., carbon pile, carbon film, or the like), a wire wound resistor (e.g., common, bifilar, or the like), an adjustable resistor, a potentiometer, and/or any other electrical component or device for reducing current flow as described herein. In some examples, the first voltage divider resistor 124A may comprise a single resistor or a plurality of resistors (e.g., in series and/or other configurations). In some examples, the second voltage divider resistor 124B may comprise a single resistor or a plurality of resistors (e.g., in series and/or other configurations). In some examples, the first voltage divider resistor 124A and the second voltage divider resistor 124B may comprise the same or similar resistance values (e.g., 1 kΩ (2 each, or another number, to with a tolerance of 10%). As shown, the output of the voltage divider 124 (e.g., the connection between the first voltage divider resistor 124A and the second voltage divider resistor 124B) is coupled to (or comprises at least in part) the feedback node 112 which is further coupled to the feedback pin 110F of the buck driver 110 (illustrated in FIG. 1A).

As illustrated in FIG. 1B, the control circuit 100 further comprises the switch input subcircuit 137 which couples the first branch transistor 116 and the second branch transistor 122 to at least the switch input 136. In some examples, the switch input subcircuit 137 as shown may include one or more of a connection to a power supply (e.g., power supply 102), a resistor, a connection to ground (e.g., grounding component 104), a transistor, and/or any other components for switching between light sources. In some examples, the switch input 136 may include one or more logical subcircuits to enable or disable current flow (e.g., at least in part, through one or more of the first branch 114A or the second branch 114B. In some examples, the switch input 136 may comprise one or more of a physical switch (e.g., toggle switch, rotary switch, etc.), an electrical switch (e.g., motion sensor, photosensor, etc.), a digital (e.g., solid-state switch, MOSFET, etc.), and/or the like for turning on or off an electronic device (e.g., electronic device 200). In some such examples, the switch input 136 may further comprise hardware (e.g., field-programmable gate arrays (FPGAs), application-specific integrated circuits (ASICs), and/or the like as described herein), software (e.g., operating systems, program code, and/or the like as described herein), and/or firmware (e.g., Basic Input/Output System (BIOS), and/or the like as described herein) for enabling or disabling current flow, at least in part, through one or more of the first branch 114A or the second branch 114B (e.g., in response to a switching condition, such as a user input, a change in lighting conditions, a change in video quality, and/or the like as described herein). For example, an outdoor security camera incorporating the control circuit 100 may further comprise a photosensor (e.g., an ambient light sensor) and/or the like (e.g., the switch input 136) for detecting ambient lighting conditions of an environment. During detection of daylight conditions (e.g., high-light conditions) the photosensor may disable current flow, at least in part, through the first branch 114A and the second branch 114B and, thus, deactivate both the visible light source 118 and the infrared light source 120. Further, as the sun begins to set the photosensor may enable current flow, at least in part, through the first branch 114A to activate the visible light source 118. During very low-light or no-light conditions the photosensor may disable current flow, at least in part, through the first branch 114A and enable current flow, at least in part, through the second branch 114B to activate the infrared light source 120.

Now that examples of the architecture and componentry for the control circuit 100 have been described above with reference to FIGS. 1A-1B, further non-limiting examples for driving the visible light source 118 and/or the infrared light source 120 with the buck driver 110 will now be described below still with reference to FIGS. 1A-1B.

Turning to FIG. 1A, it will be assumed for purposes of walking through a non-limiting example implementation that the control circuit 100 is incorporated into an electronic device (e.g., electronic device 200 as described in further detail below in connection with FIG. 2), such as an electronic security camera, doorbell camera, mobile camera or the like as described herein. The power supply 102 (e.g., a camera battery, wall socket, or the like) may supply electrical power, via the power supply pin 110C, to the buck driver 110. In addition, the enable input 106 may transmit (and/or generate) a logic high signal (or logic low signal, depending on the implementation), via the device enable input pin 110B, to enable the buck driver 110 for regulating current flow to the bridge circuit 114 (shown in FIG. 1B). Further, the PWM input 108 may transmit (and/or generate) a 100% PWM signal (e.g., to within a tolerance of 10% and/or another number), via the PWM input pin 110A, to cause the buck driver 110 to output a maximum current via the output pin 110D. In other examples, the PWM input 108 may transmit (and/or generate) a PWM signal will less than a 100% duty cycle. In addition, the maximum current (or other current) output by the buck driver 110 via the output pin 110D may flow through the current output subcircuit 111 to the bridge circuit input node 134 and, further, to one or more branches of the bridge circuit 114 (shown in FIG. 1B).

Turning to FIG. 1B, it will be further assumed for walking through the non-limiting example implementation, that the switch input 136 and/or the switch input subcircuit 137 are enabling (and/or facilitating current flow through) the first branch 114A and are disabling (and/or blocking current flow through) the second branch 114B of the bridge circuit 114. For example, the switch input 136 and/or the switch input subcircuit 137 may cause the first branch transistor 116 to be fully-ON (allowing current flow) and may cause the second branch transistor 122 to be fully-OFF (preventing or blocking current flow). As a result, the current (from the buck driver 110) may flow through the first branch transistor 116 and onto the visible light source 118 which may include one or more wLEDs (as described herein). As the current flows through the visible light source 118 then one or more wLEDs of the visible light source 118 may emit one or more wavelengths of visible light (e.g., white colored light or any other color). As the current exits the visible light source 118 and further flows through the first branch node 126, the current may cause (or the current flow may result in) a first voltage at the first branch node 126. The first voltage at the first branch node 126 may be measurable relative to the grounding component 104 or any other electrical potential reference point of the control circuit 100 (e.g., the feedback node 112, the second branch node 130, etc.). The current may further flow through the first branch node 126 to the first voltage divider resistor 124A and the first branch resistor 128. It will be understood that the current will flow through the first voltage divider resistor 124A and the first branch resistor 128 in proportion to their resistance values. In some examples, the first voltage divider resistor 124A and the second voltage divider resistor 124B may comprise the same or similar resistance values (e.g., 1 kΩ each, or another number, to with a tolerance of 10%).

As the current flows through the first voltage divider resistor 124A, the current may cause (or the current flow may result in) a feedback voltage at the feedback node 112 which may further cause or result in the buck driver 110 detecting a feedback signal (e.g., feedback voltage and/or current) via the feedback pin 110F. In some examples, the first branch resistor 128 may be selected based on a resistance value (e.g., 0.5000Ω or another number that may be determined as described herein) that will result in a specific feedback voltage (e.g., 100 mV) at the feedback node 112 (e.g., when the visible light source 118 and/or the infrared light source 120 is active or emitting light).

For example, the buck driver 110 may drive (e.g., increase and/or decrease) the current through the first branch 114A including the visible light source 118 until the voltage at the feedback node 112, which is input to (or detected at) the buck driver 110 via the feedback pin 110F, reaches 100 mV (e.g., when the PWM input 108 comprises a 100% duty cycle). When (i) the first voltage divider resistor 124A is approximately equal to the second voltage divider resistor 124B (e.g., within a tolerance of 10%), and (ii) the second branch resistor 132 is much less than the second voltage divider resistor 124B (e.g., less than 0.1%) then the voltage at the first branch node 126 will be approximately twice the voltage at the feedback node 112. Accordingly, the value of the resistance of the first branch resistor 128 may be selected to limit the current through the first branch 114A to the maximum current value associated with the visible light source 118 when the duty cycle of the PWM input 108 is at 100%.

It will now be assumed, to further walk through the non-limiting example implementation described above, that the switch input 136 and/or the switch input subcircuit 137 switches to enable (and/or facilitating current flow through) the second branch 114B and disable (and/or blocking current flow through) the first branch 114A of the bridge circuit 114. For example, the switch input 136 and/or the switch input subcircuit 137 may cause the first branch transistor 116 to be fully-OFF (preventing or blocking current flow) and may cause the second branch transistor 122 to be fully-ON (allowing current flow). As a result, the current (from the buck driver 110) may flow through the infrared light source 120, which may include one or more infrared emitters (e.g., one or more IRLEDs or the like), and onto the second branch transistor 122. As the current flows through the infrared light source 120 then one or more IRLEDs of the infrared light source 120 may emit one or more wavelengths of infrared light. As the current exits the second branch transistor 122 and further flows through the second branch node 130, the current may cause (or the current flow may result in) a second voltage at the second branch node 130. The second voltage at the second branch node 130 may be measurable relative to the grounding component 104 or any other electrical potential reference point of the control circuit 100 (e.g., the feedback node 112, the first branch node 126, etc.). The current may further flow through the second branch node 130 to the second voltage divider resistor 124B and the second branch resistor 132. It will be understood that the current will flow through the second voltage divider resistor 124B and the second branch resistor 132 in proportion to their resistance values. In some examples, the first voltage divider resistor 124A and the second voltage divider resistor 124B may comprise the same or similar resistance values (e.g., 1 kΩ each, or another number, to with a tolerance of 10%).

As the current flows through the second voltage divider resistor 124B, the current may cause (or the current flow may result in) a feedback voltage at the feedback node 112 which may further cause or result in the buck driver 110 detecting a feedback signal (e.g., feedback voltage and/or current) via the feedback pin 110F. In some examples, the second branch resistor 132 may be selected based on a resistance value (e.g., 0.3334Ω or another number that may be determined as described herein) that will result in a specific feedback voltage (e.g., 100 mV) at the feedback node 112 (e.g., when the visible light source 118 and/or the infrared light source 120 is active or emitting light).

For example, the buck driver 110 may drive (e.g., increase and/or decrease) the current through the second branch 114B including the infrared light source 120 until the voltage at the feedback node 112, which is input to (or detected at) the buck driver 110 via the feedback pin 110F, reaches 100 mV (e.g., when the PWM input 108 comprises a 100% duty cycle). When (i) the second voltage divider resistor 124B is approximately equal to the first voltage divider resistor 124A (e.g., within a tolerance of 10%), and (ii) the first branch resistor 128 is much less than the first voltage divider resistor 124A (e.g., less than 0.1%) then the voltage at the second branch node 130 will be approximately twice the voltage at the feedback node 112. Accordingly, the value of the resistance of the second branch resistor 132 may be selected to limit the current through the second branch 114B to the maximum current value associated with the infrared light source 120 when the duty cycle of the PWM input 108 is at 100%.

Now that examples for driving the visible light source 118 and/or the infrared light source 120 with the buck driver 110 have been described above with reference to FIGS. 1A-1B, a process for selecting the resistance values for the first branch resistor 128 and/or the second branch resistor 132 will now be described below still with reference to FIGS. 1A-1B.

As illustrated in FIGS. 1A-1B, the control circuit 100 may implement a single buck LED driver (e.g., buck driver 110 or the like) to drive at least two separate and distinct LEDs (e.g., the visible light source 118, the infrared light source 120, and/or the like). In some examples, the visible light source 118 and/or the infrared light source 120 may each comprise a plurality of LEDs (e.g., in series, in parallel, or some combination thereof). In some examples, either the visible light source 118 or the infrared light source 120 can be active (or ON) or both can be inactive (or OFF) at the same time. In some examples, the control circuit 100 may be configured so that it is not possible to activate both the visible light source 118 and the infrared light source 120 at the same time. In some examples, the single buck LED driver (e.g., buck driver 110) may be any standard LED buck driver similar to the examples described herein.

In some examples, the PWM (e.g., PWM input 108) may set the internal feedback voltage ($V_{FB}$) for the buck LED driver to drive a particular current for the visible light source 118 and/or the infrared light source 120 respectively. For example, a PWM of 0% to 100% provided by the PWM input 108 to the buck driver 110 may translate (or correspond) to a $V_{FB}$ of 0 mV to 100 mV (e.g., a PWM of 100% may translate (or correspond) to a $V_{FB}$ of 100 mV).

Turning to FIG. 4, it will be understood that a conventional or traditional buck LED driver circuit design, as shown, comprises one buck LED driver to drive one LED. Such traditional LED circuits use $R_{sense}$, as shown, to set the current through the LED. If $R_{sense}$ is 0.16Ω, at a PWM of 100% then 1 A of current will be required to achieve a $V_{FB}$ of 100 mV.

Turning to FIGS. 1A-1B, it will be understood that the traditional LED circuit design (shown in FIG. 4) cannot drive both the visible light source 118 (e.g., comprising one or more wLEDs) and the infrared light source 120 (e.g., comprising one or more IRLEDs) using a single buck LED driver because each light source is associated with a distinct and different forward voltage and/or current limit. Further, to maintain safe operating temperatures, the visible light source 118 and/or the infrared light source 120 cannot be driven above a wattage limit (e.g., neither light source may exceed 1.1 W or another number). To this end, for both the visible light source 118 and the infrared light source 120 to be driven by a single buck LED driver (as shown in FIGS.

1A-1B) then each light source must be driven with distinct and different current limits in order to maintain the same (or similar) wattage limit while also maintaining each respective forward voltage.

Traditionally, with a single LED (as shown in FIG. 4) traditional LED circuit designs limit the current by selecting a resistor for $R_{sense}$ with a resistance value to maintain a $V_{FB}$ that is maxed at 100 mV. In contrast, the control circuit 100 (as shown in FIGS. 1A-1B) uses a plurality of resistors and a voltage divider (e.g., voltage divider 124) to create (e.g., generate, produce, facilitate, etc.) two different current limits (e.g., based, at least in part, on which branch of the bridge circuit 114 is active). For example, when the infrared light source 120 is active it may be assumed that the first branch resistor 128 is basically a short circuit or direct connection to the grounding component 104 (or lower potential node). It will be understood that the first branch resistor 128 is not actually a short circuit because the first branch resistor 128 provides some resistance to current flow. However, the first branch resistor 128 provides much less resistance to current flow than any other component (e.g., the visible light source 118 and/or the first voltage divider resistor 124A) coupled to the first branch node 126 and, thus, the resistance of the first branch resistor 128 may be negligible (e.g., compared to the first voltage divider resistor 124A and/or the second voltage divider resistor 124B). Further, the impact of the first branch resistor 128 on the voltage divider (e.g., the balance between the first voltage divider resistor 124A and/or the second voltage divider resistor 124B) may be negligible, at least in part, because the first branch resistor 128 is significantly weaker than the voltage divider resistors (e.g., less than 0.1%). As a result, the buck driver 110 can drive enough current until $V_{FB}$ reaches 100 mV (e.g., to within a tolerance of 10%) at the feedback node 112 (e.g., assuming a PWM of 100%). In some such examples, when $V_{FB}$ reaches 100 mV at feedback node 112, the voltage at the second branch node 130 will be approximately 200 mV, assuming that (i) the first voltage divider resistor 124A is approximately equal to the second voltage divider resistor 124B (e.g., within a tolerance of 10%), and (ii) the first branch resistor 128 is much less than the first voltage divider resistor 124A (e.g., less than 0.1%). It will be understood that the input voltage (e.g., at the second branch node 130) will be approximately twice the output voltage (e.g., at the feedback node 112) because a voltage divider with approximately equal resistors will reduce the input voltage by approximately (e.g., to within a tolerance of 10%) half. In some such examples, the current limit for the infrared light source 120 may be 600 mA (e.g., to within a tolerance of 10%). Accordingly, the resistance value for the second branch resistor 132 may be selected to limit the current through the infrared light source 120 to less than or equal to 600 mA. For example, the resistance value for the second branch resistor 132 may be determined, using Ohm's law, to be $$\frac{0.200V}{0.600A} = 0.333\Omega.$$

Moreover, when the visible light source 118 is active, the inverse is true. For example, when the visible light source 118 is active it may be assumed that the second branch resistor 132 is functioning as a short circuit (or direct connection to the grounding component 104). It will be understood that the second branch resistor 132 is not actually a short circuit because the second branch resistor 132 provides some resistance to current flow (e.g., 0.333Ω). However, the second branch resistor 132 provides much less resistance to current flow than any other component (e.g., the second branch transistor 122 and/or the second voltage divider resistor 124B) coupled to the second branch node 130 and, thus, the resistance of the second branch resistor 132 may be negligible (e.g., compared to the first voltage divider resistor 124A and/or the second voltage divider resistor 124B). Further, the impact of the second branch resistor 132 on the voltage divider (e.g., the balance between the first voltage divider resistor 124A and/or the second voltage divider resistor 124B) is negligible, at least in part, because the second branch resistor 132 is significantly weaker than the voltage divider resistors (e.g., less than 0.1%). As a result, the buck driver 110 can drive enough current until $V_{FB}$ reaches 100 mV (e.g., to within a tolerance of 10%) at the feedback node 112 (e.g., assuming a PWM of 100%). In some such examples, when $V_{FB}$ reaches 100 mV at feedback node 112, the voltage at the first branch node 126 will be approximately 200 mV, assuming that (i) the second voltage divider resistor 124B is approximately equal to the first voltage divider resistor 124A (e.g., within a tolerance of 10%), and (ii) the second branch resistor 132 is much less than the second voltage divider resistor 124B (e.g., less than 0.1%). It will be understood that the input voltage (e.g., at the first branch node 126) will be approximately twice the output voltage (e.g., at the feedback node 112) because a voltage divider with approximately equal resistors will reduce the input voltage by approximately (e.g., to within a tolerance of 10%) half. In some such examples, the current limit for the visible light source 118 may be 400 mA (e.g., to within a tolerance of 10%) and the resistance value for the first branch resistor 128 to maintain a $V_{FB}$ of 100 mV (e.g., at the feedback node 112) may be determined using Ohm's law, $$\frac{0.200V}{0.400A} = 0.500\Omega.$$

In some examples, the voltage established at the first branch node 126 and/or the second branch node 130 may be determined using Equation 1 as shown below:

$$V_{in} = \frac{R_1 + R_2}{R_2} \cdot V_{out}; \tag{1}$$

where $V_{in}$ is the voltage of the input node (e.g., the active branch will correspond to the input node including the first branch node 126 and/or the second branch node 130) of the voltage divider 124;

where $R_1$ is the resistor coupled to the input node and/or the active branch (e.g., the first voltage divider resistor 124A when the first branch 114A is active or the second voltage divider resistor 124B when the second branch 114B is active);

where $R_2$ is the resistor coupled to the "short circuit" and/or the inactive branch (e.g., the second voltage divider resistor 124B when the first branch 114A is active or the first voltage divider resistor 124A when the second branch 114B is active), as described above $R_1$ and $R_2$ may be approximately equal; and where $V_{out}$ is the feedback voltage ($V_{FB}$) of the feedback node 112.

In some examples, if the first branch 114A is active then the first branch node 126 may be referenced as $V_{in}$ for the voltage divider 124. If the second branch 114B is active, then the second branch node 130 may be referenced as $V_{in}$ for the voltage divider 124. In some examples, $V_{out}$ may equal the $V_{FB}$ when either the first branch 114A or the second branch 114B are active. In some examples, $R_1$ may equal (or approximately equal) $R_2$. In such examples, the $V_{in}$ will be approximately twice the $V_{out}$, or the $V_{out}$ will be approximately half of the $V_{in}$.

Now that various examples for the control circuit 100 have been described above with reference to FIGS. 1A-1B, examples of electronic devices that may benefit from the control circuit 100 will now be described in further detail below with reference to FIG. 2.

Figure 2:
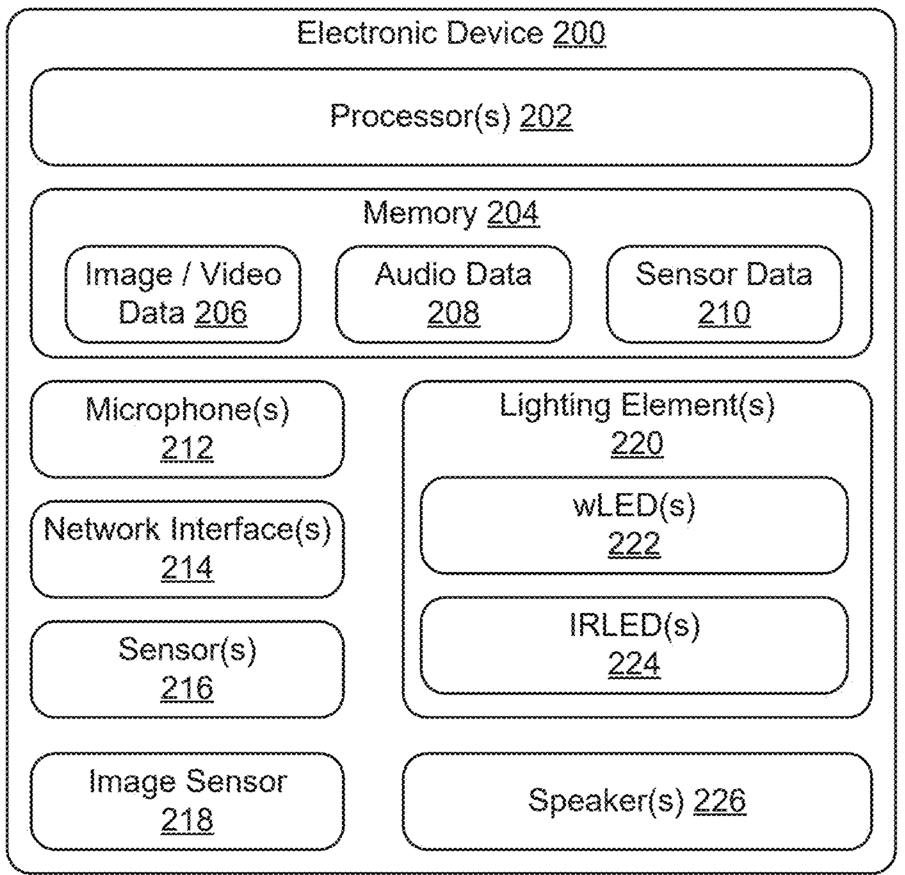
FIG. 2 illustrates an example electronic device, in accordance with various aspects of the present disclosure.

FIG. 2 illustrates example components of an electronic device 200, according to examples of the present disclosure. The electronic device 200 is shown including processor(s) 202 and memory 204, where the processor(s) 202 may perform various functions associated with controlling an operation of the electronic device 200, and the memory 204 may store instructions executable by the processor(s) 202 to perform the operations described herein.

The electronic device 200 includes the image sensor 218 for capturing image/video data 206 within an environment of the electronic device 200. In some instances, the image sensor 218 may include Red, Green, Blue, Depth (RGBD) camera(s) and/or three-dimensional (3D) sensors. Additionally, the electronic device 200 may include other sensor(s) 216 (e.g., ambient light sensor, temperature sensor, accelerometer, ambient light sensor or photosensor, etc.) that generate the sensor data 210 (e.g., high or low logic indicators, ambient light values, and/or the like as described herein). In some instances, the image sensor 218 may be used to detect motion. For example, computer vision techniques may be used to detect objects of interest. In some instances, the image sensor 218 may include a CMOS image sensor, and a digital processor that may perform embedded processing within the low-power CVM itself, such that the low-power CVM may output post-processed computer vision metadata to the processor(s) 202. The metadata may include information such as the presence of a particular type of entity (e.g., person, animal, vehicle, parcel, etc.), a direction of movement of the entity, a distance of the entity from the electronic device 200, etc. As a result of including the computer vision, the electronic device 200 may leverage computer vision to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. However, although described as using the image sensor 218 to detect motion, the electronic device 200 may include additional or alternative sensor(s) for detecting motion (e.g., passive infrared sensor(s) (PIRs)).

In some instances, in response to detecting motion, the processor(s) 202 that causes the image sensor 218 to capture the image/video data 206. Additionally, or alternatively, in response to detecting sound greater than a certain threshold (e.g., decibel), the image sensor 218 may begin capturing the image/video data 206.

The electronic device 200 also includes light source(s) 220, such as IRLED(s) 224 and/or wLED(s) 222 (e.g., white or neutral light LED(s)), for illuminating an area and/or emitting light (e.g., visible, IR, etc.) within the environment (e.g., under low-light and/or no-light conditions) of the electronic device 200. In some examples, the visible light source 118 may be the same or similar to the wLED(s) 222 (e.g., the visible light source 118 may comprise one or more of the wLED(s) 222 as described herein). In some examples, the infrared light source 120 may be the same or similar to the IRLED(s) 224 (e.g., the infrared light source 120 may comprise one or more of the IRLED(s) 224 as described herein). The light source(s) 220 may also output an indication of an operational status of the electronic device 200 (e.g., one or more of the wLED(s) 222 may flash, blink, change color, and/or the like to indicate an operational status to a user). Any number of IRLED(s) 224 and/or wLED(s) 222 may be included, and the IRLED(s) 224 and the wLED(s) 222 may be arranged about various sides of the electronic device 200 (e.g., front, sides, etc.). The IRLED(s) 224 may be used to detect motion in low-light and/or no-light conditions. In some instances, the visible light source 118 and/or the infrared light source 120 may be configured to illuminate (or emit light) based on the electronic device 200 sensing motion, and/or based on ambient light condition(s) being beneath a threshold. In some examples, the visible light source 118 and/or the infrared light source 120 may be configured to dim or brighten in proportion to lighting conditions. For example, the visible light source 118 (and/or the infrared light source 120) may become progressively brighter (e.g., by adjusting the PWM input 108 between 0% and 100%) as the environmental lighting conditions decrease (e.g., the sunsets). In some such examples, the visible light source 118 may deactivate and the infrared light source 120 may activate when the lighting conditions decrease below a minimum threshold.

The electronic device 200 includes microphone(s) 212 that generate audio data 208. The speaker(s) 226 may output sound in a direction away from the electronic device 200. The sound output by the speaker(s) 226 may include the audio data 208, which may be received from one or more communicatively coupled devices, and/or other audio (e.g., siren, alarm, etc.).

Network interface(s) 214 permit the electronic device 200 to communicate over one or more networks. Example network interface(s) 214 include, without limitation, Wi-Fi, Bluetooth, ZigBee, Bluetooth Low Energy (BLE), LTE, and so forth. The network interface(s) 214 permit communication with remote device(s), such as mobile devices (e.g., phone), systems (e.g., cloud), and so forth. The network(s) may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some instances, inbound data from may be routed through the network interface(s) 214 before being directed to the processor(s) 202, and outbound data from the processor(s) 202 may be routed through the network interface(s) 214. The network interface(s) 214 may therefore receive inputs, such as data, from the processor(s) 202, the image sensor 218, and so forth. For example, the network interface (s) 214 may be configured to transmit data to and/or receive data from one or more network devices. The network interface(s) 214 may act as a conduit for data communicated between various components and the processor(s) 202.

Although certain components of the electronic device 200 are illustrated, it is to be understood that the electronic device 200 may include additional or alternative components. For example, the electronic device 200 may include other input/output devices (e.g., display screen), heat dissipating elements (e.g., heatsinks, fans, vents, etc.), computing components (e.g., Printed Circuit Boards (PCBs), such as to couple the components for the control circuit 100 and/or the like as described herein), antennas, ports (e.g., USB), and so forth. In some examples, the electronic device 200 may be powered by mains electricity (e.g., a wall socket coupled to a public power grid). In some examples, the electronic device 200 may be powered via one or more batteries. In some such examples, the one or more batteries may power the device instead of mains electricity and/or the one or more batteries may be a backup power supply (e.g., power supply 102), such as if the mains electricity is unavailable (e.g., during a power outage, if a criminal cuts the power cord, etc.).

As used herein, a processor, such as the processor(s) 202, may include multiple processors and/or a processor having multiple cores. Further, the processor(s) 202 may comprise one or more cores of different types. For example, the processor(s) 202 may include application processor units, graphic processing units, and so forth. In one implementation, the processor(s) 202 may comprise a microcontroller and/or a microprocessor. The processor(s) 202 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), and/or the like. Additionally, each of the processor(s) 202 may possess its own local memory, which also may store program components, program data, program code, program instructions, and/or one or more operating systems.

Memory, such as the memory 204, may include volatile and nonvolatile memory, removable and non-removable media implemented in any method or technology for storage of information, such as computer-readable instructions, data structures, program component, or other data. The memory 204 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 204 may be implemented as computer-readable storage media ("CRSM"), which may be any available physical media accessible by the processor(s) 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information, and which can be accessed by the processor(s). The memory 204 are examples of non-transitory computer-readable media. The memory 204 may store an operating system and one or more software applications, instructions, programs, and/or data to implement the methods described herein and the functions attributed to the various systems.

Figure 3:
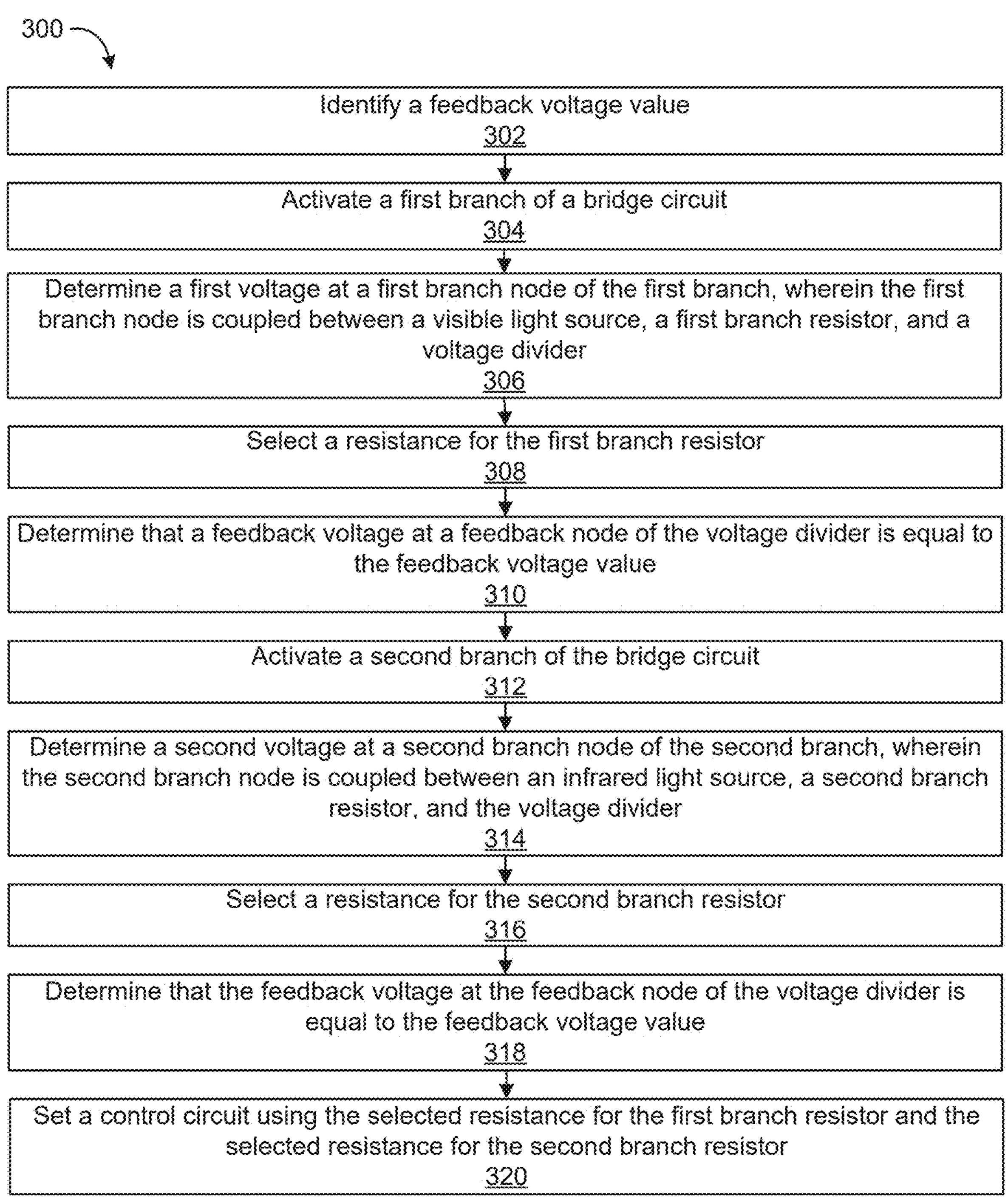
FIG. 3 illustrates an example process for selecting various components for an example control circuit, in accordance with various aspects of the present disclosure.

FIG. 3 illustrates an example process for selecting various components for an example control circuit, in accordance with various aspects of the present disclosure. As shown, the process 300 may be used for selecting a resistor with a particular resistance value (e.g., based at least in part on a voltage, current, and/or load associated with a lighting source or other electrical load). The operations of the process 300 may represent a series of instructions comprising computer readable machine code executable by a processing unit of one or more computing devices described herein (e.g., electronic device 200, a circuit design application, and/or any other computing device), although various operations may also be implemented in, or using, hardware (e.g., voltage sensors, current sensors, multimeters, and/or adjustable resistors of an example electronic device 200 and/or the control circuit 100). In some examples, the computer readable machine codes may be comprised of instructions selected from a native instruction set of at least one processor and/or an operating system of the electronic device. In some examples, the process 300 may be performed by one or more computing devices comprising the electronic device 200 and/or the control circuit 100.

As shown in FIG. 3, the process 300 may begin at operation 302, at which the electronic device 200 (or the like as described herein) may identify a feedback voltage value. In some examples, the feedback voltage value may represent a maximum feedback voltage that is rated for a buck driver and/or another type of driver Integrated Circuit (IC) for controlling another circuit and/or component by regulating current flow. In some examples, a PWM input may set the feedback voltage value for the buck driver (or the like) in order to drive a particular current for another circuit and/or component (e.g., a wLED, IRLED, and/or the like as described herein). For instance, a PWM input of 0% to 100% may translate (or correspond) to a feedback voltage value of 0 mV to 100 mV. For example, a PWM input of 100% may translate (or correspond) to a feedback voltage value of 100 mV. As described herein, the same feedback voltage value may be used for various components with distinct (or different) forward voltages and/or current limits, such as a wLED and an IRLED. In some examples, the operation 302 may include determining a feedback voltage value based at least in part on a buck driver, a wLED, an IRLED, and/or the like as described herein. In some examples, the feedback voltage value may be identified as 100 mV (or another number) to within a tolerance of 10%.

The process 300 may continue at operation 304, at which the electronic device 200 (or the like as described herein) may activate a first branch of a bridge circuit. In some examples, activating the first branch of a bridge circuit may further cause activation of a wLED and/or another visible light source which may result in a first voltage at a first branch node downstream of the wLED and/or any other visible light source. In some examples, the voltage and/or current associated with the first branch node may be regulated, influenced, or controlled, at least in part by a first branch resistor.

The process 300 may continue at operation 306, at which the electronic device 200 (or the like as described herein) may determine a first voltage at a first branch node of the first branch, wherein the first branch node is coupled between a visible light source, a first branch resistor, and a voltage divider. In some examples, the operation 306 may include measuring a first voltage at a first branch node of the first branch using one or more of a voltage sensor, a voltmeter, multimeter, and/or any other electrical instrumentation for measuring a voltage current, and/or resistance. In some examples, the operation 306 may include calculating a first voltage at a first branch node of the first branch using one or more known values for the circuit (e.g., component data sheet values including voltages, currents, and/or resistances), measured values (e.g., voltages, currents, and/or resistances measured with electrical instrumentation). In some examples, the operation 306 may include calculating a first voltage at a first branch node of the first branch using Ohm's law, Equation 1 (as described herein), and/or any other equations for determining a voltage as described herein or included in the claims. In some examples, the first voltage may be determined to be 200 mV (or another number) to within a tolerance of 10%.

The process 300 may continue at operation 308, at which the electronic device 200 (or the like as described herein) may select a resistance for the first branch resistor. In some examples, the voltage divider may include a first voltage divider resistor and a second voltage divider resistor. The resistance for the first branch resistor may be selected in relation to the resistance of the first voltage divider resistor and/or the second voltage divider resistor. For example, the resistance for the first branch resistor may be selected in order to provide a resistance that is less than or equal to 0.1% of the resistance of the first voltage divider resistor and/or the second voltage divider resistor. In some examples, the resistance for the first branch resistor may be selected to define a maximum current that will flow into the voltage divider via the first voltage divider resistor in order to produce the identified feedback voltage value (as described above at the operation 302) at the output of the voltage divider and/or at a feedback node (or feedback pin) coupled to a buck driver (or the like). In some examples, the resistance selected for the first branch resistor may be several magnitudes less than the resistance of the first voltage divider resistor and/or the second voltage divider resistor. For example, the first voltage divider resistor and/or the second voltage divider resistor may have a resistance of 1 kΩ, and the resistance selected for the first branch resistor may be 0.5005Ω or another number that is several magnitudes less than 1 kΩ. It should be appreciated that the impact of the inactive branch resistor on the voltage divider ability to reduce the voltage (from the input node to the feedback or output node) by half is negligible because the branch resistors are significantly weaker than the voltage divider resistors (e.g., less than 0.1%).

The process 300 may continue at operation 310, at which the electronic device 200 (or the like as described herein) may determine that a feedback voltage at a feedback node of the voltage divider is equal to the feedback voltage value (e.g., identified at operation 302). In some examples, the operation 310 may include confirming that the feedback voltage at a feedback node (produced in response to the resistance selected for the first branch resistor at the operation 308) is equal to (within a tolerance of 10%) the identified feedback voltage value (identified at the operation 302). In some examples, the operation 310 may include measuring a feedback voltage at a feedback node using a voltmeter and/or any other instrumentation. In some examples, the operation 310 may include measuring a feedback voltage at a feedback node using a circuit simulation software. In some examples, the operation 310 may include comparing a feedback voltage (e.g., a measured feedback voltage and/or a simulated feedback voltage) at a feedback node to the identified feedback voltage value in order to determine that the feedback voltage produced by the first branch resistor is approximately equal to (e.g., to within a tolerance of 10%) the feedback voltage value (e.g., identified at operation 302).

The process 300 may continue at operation 312, at which the electronic device 200 (or the like as described herein) may activate a second branch of the bridge circuit. In some examples, activating the second branch of a bridge circuit may further cause activation of an IRLED and/or another infrared light source which may result in a second voltage at a second branch node downstream of the IRLED and/or another infrared light source. In some examples, the voltage and/or current associated with the second branch node may be regulated, influenced, or controlled, at least in part by a second branch resistor. In some examples, the operation 312 may include deactivating the first branch of the bridge circuit.

The process 300 may continue at operation 314, at which the electronic device 200 (or the like as described herein) may determine a second voltage at a second branch node of the second branch, wherein the second branch node is coupled between an infrared light source, a second branch resistor, and the voltage divider. In some examples, the operation 314 may include measuring a second voltage at a second branch node of the second branch using one or more of a voltage sensor, a voltmeter, multimeter, and/or any other electrical instrumentation for measuring a voltage current, and/or resistance. In some examples, the operation 314 may include calculating a second voltage at a second branch node of the second branch using one or more known values for the circuit (e.g., component data sheet values including voltages, currents, and/or resistances), measured values (e.g., voltages, currents, and/or resistances measured with electrical instrumentation). In some examples, the operation 314 may include calculating a second voltage at a second branch node of the second branch using Ohm's law, Equation 1 (as described herein), and/or any other equations for determining a voltage as described herein or included in the claims. In some examples, the second voltage may be determined to be 200 mV (or another number) to within a tolerance of 10%.

The process 300 may continue at operation 316, at which the electronic device 200 (or the like as described herein) may select a resistance for the second branch resistor. In some examples, the voltage divider may include a first voltage divider resistor and a second voltage divider resistor. The resistance for the second branch resistor may be selected in relation to the resistance of the first voltage divider resistor and/or the second voltage divider resistor. For example, the resistance for the second branch resistor may be selected in order to provide a resistance that is less than or equal to 0.1% of the resistance of the first voltage divider resistor and/or the second voltage divider resistor. In some examples, the resistance for the second branch resistor may be selected to define a maximum current that will flow into the voltage divider via the second voltage divider resistor in order to produce the identified feedback voltage value (as described above at the operation 302) at the output of the voltage divider and/or at a feedback node (or feedback pin) coupled to a buck driver (or the like). In some examples, the resistance selected for the second branch resistor may be several magnitudes less than the resistance of the first voltage divider resistor and/or the second voltage divider resistor. For example, the first voltage divider resistor and/or the second voltage divider resistor may have a resistance of 1 kΩ, and the resistance selected for the second branch resistor may be 0.3336Ω or another number that is several magnitudes less than 1 kΩ. It should be appreciated that the impact of the inactive branch resistor on the voltage divider ability to reduce the voltage (from the input node to the feedback or output node) by half is negligible because the branch resistors are significantly weaker than the voltage divider resistors (e.g., less than 0.1%).

The process 300 may continue at operation 318, at which the electronic device 200 (or the like as described herein) may determine that a feedback voltage at a feedback node of the voltage divider is equal to the feedback voltage value (e.g., identified at operation 302). In some examples, the operation 318 may include confirming that the feedback voltage at a feedback node (produced in response to the resistance selected for the second branch resistor at the operation 316) is equal to (within a tolerance of 10%) the identified feedback voltage value (identified at the operation 302). In some examples, the operation 318 may include measuring a feedback voltage at a feedback node using a voltmeter and/or any other instrumentation. In some examples, the operation 318 may include measuring a feedback voltage at a feedback node using a circuit simulation software. In some examples, the operation 318 may include comparing a feedback voltage (e.g., a measured feedback voltage and/or a simulated feedback voltage) at a feedback node to the identified feedback voltage value in order to determine that the feedback voltage produced by the second branch resistor is approximately equal to (e.g., to within a tolerance of 10%) the feedback voltage value (e.g., identified at operation 302).

The process 300 may continue at operation 320, at which the electronic device 200 (or the like as described herein) may set a control circuit using the selected resistance for the first branch resistor and the selected resistance for the second branch resistor. In some examples, such as when the process 300 is performed using a circuit design application, the operation 320 may include assembling, manufacturing, and/or producing a control circuit (e.g., control circuit 100 or the like as described herein) using the selected resistance for the first branch resistor (from the operation 308 as described above) and the selected resistance the second branch resistor (from the operation 316 as described above). In some examples, such as when the process 300 is performed using an electronic device 200 and/or the control circuit 100 comprising one or more adjustable resistors (e.g., variable resistors, and/or any other component that can change its internal electrical resistance), the operation 320 may include setting the first branch resistor to the resistance selected at the operation 308 (as described above) and setting the second branch resistor to the resistance selected at the operation 316 (as described above). In some such examples, a visible light source (e.g., the visible light source 118) may comprise a plurality of wLEDs (or the like) and the resistance required at the first branch resistor may change (e.g., as more/less wLEDs are activated/deactivated, such as in response to changing light conditions) to maintain the identified feedback voltage at the feedback node. In some examples, an infrared light source (e.g., the infrared light source 120) may comprise a plurality of IRLEDs (or the like) and the resistance required at the second branch resistor may change (e.g., as more/less IRLEDs are activated/deactivated, such as in response to changing light conditions) to maintain the identified feedback voltage at the feedback node.

Various systems and processes described herein may include or be implemented using or in conjunction with or for a device or electronic device. A device or electronic device may be, for example, any electronic device equipped with a light source. Further, a device or electronic device may be one or more of a webcam, security camera, doorbell camera, desktop computer, laptop computer, tablet computer, smartphone, wearable device (e.g., headset, smartwatches, smart glasses, etc.), and/or similar electronic devices equipped with at least a camera and a light source and/or any other physical componentry necessary to perform the various operations described herein (e.g., a switch, a photosensor, Infrared (IR) sensor, and/or the like). Furthermore, computing devices such as smartphones, laptop computers, tablet computers, and/or wearable devices may generally be referred to as mobile devices.

Various systems and processes described herein may include or be implemented using or in conjunction with or for a light source. A light source may be, for example, any component or device capable of emitting electromagnetic radiation. In some examples, the electromagnetic radiation may, or may not, be perceivable by the human eye. For example, a visible light source may emit white light, or any other color light, (e.g., electromagnetic radiation between 400 nm to 700 nm in wavelength) which may be perceivable by the human eye. However, an IR light source may emit IR light (e.g., electromagnetic radiation between 750 nm to 1000 μm in wavelength) which may not be perceivable by the human eye. It will be understood that light (i.e., electromagnetic radiation), even if not perceivable to the human eye, may be detectable by one or more sensors (e.g., photosensors, image sensors, IR sensors, and/or the like) of an electronic device. Further, a light source may be, for example, one or more of a Light Emitting Diode (LED) (e.g., wLED, IRLED, and/or any other LED), incandescent light bulb, Compact Fluorescent Lamp (CFL), Halogen light bulb, and/or any similar electrically powered light emitting device configured to produce electromagnetic radiation (e.g., visible, IR, Ultraviolet (UV), etc.).

Various systems and processes described herein may be implemented by coupling two or more components. A couple, coupler, or coupling may be, for example, any connection between two or more components of one or more electronic devices. For example, a power supply may be coupled to a light source (e.g., LED, etc.) via a direct connection (e.g., by a wire and/or any other electrically conductive material) or an indirect connection (e.g., by one or more wires, any other electrically conductive material, and/or one or more other interceding components). In some examples, a node of a circuit may couple (and/or be coupled to) two or more components of the circuit. For example, a node may couple (and/or be coupled to) two resistors of a voltage divider and a feedback pin (or input) of a buck driver.

As set forth above, certain methods or process blocks may be skipped or omitted in some implementations. Blocks or operations may be added to some implementations. The methods and processes described herein are also not limited to any particular sequence or order, and the blocks or operations relating thereto can be performed in other sequences or orders that are appropriate. For example, described blocks or operations may be performed in an order other than that specifically disclosed, or multiple blocks or operations may be combined in a single block or state. For instance, two or more blocks or operations may be executed concurrently or with partial concurrence. The example blocks or operations may be performed in serial, in parallel, or in some other manner. For example, the order of execution of two or more blocks or operations may be scrambled relative to the order described. For instance, two or more blocks or operations may be executed concurrently or with partial concurrence. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another or may be combined in various ways. All possible combinations and sub-combinations are intended to fall within the scope of this disclosure.

In addition, conditional language, such as, among others, “can,” “could,” “might,” or “may,” unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. An electronic device comprising:
- a camera;
- a power supply;
- a printed circuit board (PCB);
- a control circuit coupled to the PCB, wherein the control circuit comprises:
  - a bridge circuit comprising a voltage divider; and
  - a buck light-emitting diode (LED) driver comprising:
    - a power input coupled to the power supply,
    - a feedback input coupled to a voltage output of the voltage divider, and
    - a current output coupled to a first branch and a second branch of the bridge circuit;
  - a visible light source comprising a visible LED coupled to the first branch of the bridge circuit between the current output of the buck LED driver and the voltage divider; and
  - an infrared light source comprising an infrared LED coupled to the second branch of the bridge circuit between the current output of the buck LED driver and the voltage divider.

2. The electronic device of claim 1, wherein the bridge circuit further comprises:
- a first resistor coupled to a first node, wherein the first node is coupled to an output of the visible LED and the voltage divider;
- wherein the first resistor comprises a first resistance value that limits a first current, through the visible LED, to less than or equal to a first maximum current associated with the visible LED when a feedback voltage value of the voltage divider is at a first maximum voltage value to a tolerance of within 10%;
- a second resistor coupled to a second node, wherein the second node is coupled to an output of the infrared LED and the voltage divider; and
- wherein the second resistor comprises a second resistance value that limits a second current value, through the infrared LED, to less than or equal to a second maximum current value associated with the infrared LED when the feedback voltage value of the voltage divider is at a second maximum voltage value to a tolerance of within 10%.

3. The electronic device of claim 2, wherein the voltage divider further comprises:
- a third resistor comprising a third resistance value, wherein the first resistance value is less than or equal to 0.1% of the third resistance value, and wherein the first resistance value defines the first maximum current; and
- a fourth resistor comprising a fourth resistance value that is equal to the third resistance value to a tolerance of within 10%, wherein the second resistance value is less than or equal to 0.1% of the fourth resistance value, and wherein the second resistance value defines the second maximum current value, wherein the feedback voltage value is measured at the voltage output of the voltage divider, wherein the voltage output of the voltage divider is coupled to a node between the third resistor and the fourth resistor.

4. A control circuit comprising:
- a bridge circuit comprising:
  - a voltage divider;
  - a first resistance coupled to a first node; and
  - a second resistance coupled to a second node;
- a driver comprising:
  - a feedback input coupled to the voltage divider, and
  - a current output coupled to the bridge circuit;
- a first light source coupled to the bridge circuit, wherein the first node is coupled to an output of the first light source and the voltage divider; and
- a second light source coupled to the bridge circuit, wherein the second node is coupled to an output of the second light source and the voltage divider.

5. The control circuit of claim 4, wherein the first resistance limits a first current, through the first light source, to within a first maximum current associated with the first light source when a feedback voltage of the voltage divider is at a first maximum voltage to a tolerance of within 10%.

6. The control circuit of claim 5, wherein the second resistance limits a second current, through the second light source, to within a second maximum current associated with the second light source when the feedback voltage of the voltage divider is at a second maximum voltage to a tolerance of within 10%.

7. The control circuit of claim 6, wherein the voltage divider further comprises:
- a third resistance, wherein the first resistance is less than or equal to 0.1% of the third resistance, and wherein the first resistance defines the first maximum current; and
- a fourth resistance that is equal to the third resistance to a tolerance of within 10%, wherein the second resistance is less than or equal to 0.1% of the fourth resistance, and wherein the second resistance defines the second maximum current.

8. The control circuit of claim 7, wherein the voltage divider further comprises:
- a feedback node that is coupled between the third resistance and the fourth resistance, wherein the feedback node is further coupled to the feedback input of the driver, and wherein a feedback voltage is determined at the feedback node.

9. The control circuit of claim 8, wherein the driver is configured to cause transmission, via the current output, of a current to the first light source;

wherein the current results in a first voltage at the first node between an output of the first light source and the voltage divider; and wherein a first feedback voltage at the feedback node results in the first voltage at the first node.

10. The control circuit of claim 9, wherein the first voltage at the first node between the output of the first light source and the voltage divider is represented by $$V_1 = \frac{R_3 + R_4}{R_4} \cdot V_{FB1};$$

wherein $V_{FB1}$ is a first feedback voltage;

wherein $R_4$ is the fourth resistance of the voltage divider;

wherein $R_3$ is the third resistance of the voltage divider; and wherein $V_1$ is the first voltage at the first node between the output of the first light source and the voltage divider.

11. The control circuit of claim 8, wherein the driver is configured to cause transmission, via the current output, of a current to the second light source;

wherein the current results in a second voltage at the second node between an output of the second light source and the voltage divider; and wherein a second feedback voltage at the feedback node results in the second voltage at the second node.

12. The control circuit of claim 11, wherein the second voltage at the second node between an output of the second light source and the voltage divider, is represented by $$V_2 = \frac{R_3 + R_4}{R_3} \cdot V_{FB2};$$

wherein $V_{FB2}$ is the second feedback voltage;

wherein $R_4$ is the fourth resistance of the voltage divider;

wherein $R_3$ is the third resistance of the voltage divider; and wherein $V_2$ is the second voltage at the second node between an output of the second light source and the voltage divider.

13. The control circuit of claim 4, further comprising:

a switch; and wherein:

the bridge circuit further comprises a first transistor associated with the first light source and a second transistor associated with the second light source;

the first transistor and the second transistor are further coupled to the switch; and the switch is configured to:

activate and deactivate, via the first transistor, the first light source; and activate and deactivate, via the second transistor, the second light source.

14. An electronic device comprising:

driver circuitry comprising:

a feedback input terminal, and an output terminal; and bridge circuit comprising:

a voltage divider, a first branch coupled to the feedback input terminal and the output terminal, the first branch comprising a first node, a first resistor and a first light source, wherein the first resistor is coupled to the first node, wherein an output of the first light source and the voltage divider are coupled to the first node, wherein the first resistor has a first resistance that limits a current through the first light source to within a first maximum current associated with the first light source, and a second branch coupled to the feedback input terminal and the output terminal, the second branch of circuit components comprising a second node, a second resistor and a second light source, wherein the second resistor is coupled to the second node, wherein an output of the second light source and the voltage divider are coupled to the second node, wherein the second resistor has a second resistance that limits a current through the second light source to within a second maximum current associated with the second light source.

15. The electronic device of claim 14, wherein the electronic device is a security camera device.

16. The electronic device of claim 14, wherein the electronic device is a video doorbell device.

17. The electronic device of claim 14, wherein the first resistor limits the current through the first light source when the first light source is on and the second light source is off or when a feedback voltage is at a maximum voltage to a tolerance of within 10%; and wherein the second resistor limits the current through the second light source when the first light source is off and the second light source is on or when the feedback voltage is at the maximum voltage to a tolerance of within 10%.

18. The electronic device of claim 17, wherein the first branch of circuit components comprises a third resistor;

wherein the second branch of circuit components comprises a fourth resistor;

wherein a resistance of the first resistor is less than or equal to 0.1% of a resistance of the third resistor, and wherein the first resistor primarily determines the first maximum current; and wherein a resistance of the second resistor is less than or equal to 0.1% of a resistance of the fourth resistor, and wherein the second resistor primarily determines the second maximum current.

19. The electronic device of claim 18, wherein a resistance of the third resistor is within 10% of a resistance of the fourth resistor.

20. The electronic device of claim 17, wherein the first branch of circuit components comprises a third resistor;

wherein the second branch of circuit components comprises a fourth resistor;

wherein a resistance of the first resistor is less than 1% of a resistance of the third resistor, and wherein the first resistor primarily determines the first maximum current; and wherein a resistance of the second resistor is less than 1% of a resistance of the fourth resistor, and wherein the second resistor primarily determines the second maximum current.

* * * * *